3,160,598
POLYETHYLENE RESIN FILLERS, PROCESS OF PREPARING THE SAME AND POLYETHYLENE COMPOSITIONS CONTAINING FILLERS
Pierre Delfosse, 31 Rue Cambaceres, Paris VIII, France
No Drawing. Filed July 28, 1958, Ser. No. 751,133
Claims priority, application France Dec. 27, 1957
1 Claim. (Cl. 260—23)

The present invention relates to the manufacture of improved polyethylene compositions containing fillers.

Throughout this specification and the claim, the term "polyethylene" comprises any polymer including more than 50% ethylene groups in the molecule.

It has been proposed to cross-link the linear macromolecules of polyethylene by subjecting the resin to the action of rubber vulcanization accelerators or p,p'-diphenyl bis sulfonyl hydrazide. It has also been proposed, for the same purpose, to subject polyethylene to radiation, for instance by electromagnetic waves in the ultraviolet range. The latter procedure is very costly.

Heretofore, polyethylene resins prepared either by high or low pressure polymerization have almost always been used without fillers by manufacturers of polyethylene articles.

Certain pigments in amounts of from about 1 to 5% by weight, based on the resin, have been incorporated in polyethylene to give it a desired color or opacity. Carbon black or titanium dioxide have been used for this purpose, for instance.

More recently, polyethylene compositions containing a carbon black filler have been produced with the aid of organic peroxide cross-linking agents, for instance dicumyl peroxide, the filler being present in the composition in an amount of 30% to 50% by weight, based on the resin, or even higher. While such polyethylene compositions have proved to be considerably cheaper and, at the same time, of higher quality and to have better mechanical properties than pure polyethylene without a filler, many manufacturing difficulties have been encountered. For instance, it has been found that the peroxide must be incorporated in the resin very rapidly and at the end of the mixing to avoid an excessively fast transformation of the polyethylene, which would make its further working, such as extrusion, difficult or impossible.

It is accordingly a primary object of the present invention to facilitate the manufacture of polyethylene compositions containing fillers.

It is a concomitant object of this invention to improve the incorporation and dispersion of cross-linking agents in polyethylene.

It is another object of the invention to provide a novel filler material for polyethylene.

Any polyethylene resin, whether produced at high pressure or at low pressure, or any mixture of such resins, may be processed in accordance with the invention. In accordance with the invention, the organic peroxide cross-linking agent is fixed to filler material particles, whereupon the coated filler particles are mixed with the polyethylene resin and the mixture is heated in the conventional manner to effect cross-linking. Since each particle of filler material carries the cross-linking agent, perfect and rapid distribution and dispersion throughout the resin is assured.

Since the surface area of the cross-linking agent thus becomes at least approximately that of the filler particles which they coat, maximum effectiveness of the cross-linking agent is assured.

Organic peroxides useful as cross-linking agents in the process of the present invention include substances of the general formula R—O—O—R¹, wherein the organic radicals R and R¹ are α-aryl substituted alkyl groups. The aryl substituent is preferably a phenyl group which may be substituted by a non-aryl group, such as an alkylphenyl, a chlorophenyl or a nitrophenyl. Preferred peroxides are dicumyl peroxide ($C_3H_7.C_6H_4$—O—O—$C_6H_4.C_3H_7$) and its derivatives.

If desired, conventional rubber vulcanization accelerators, including sulfur, organic sulfur compounds and organic nitrogen compounds wherein the nitrogen is linked directly to oxygen, may be used in the process as auxiliary cross-linking agents to link any valences freed by the action of the peroxide. For instance, N-cyclo-hexylbenzothiazylsulfonamide has been found useful in this respect. Such an auxiliary cross-linking agent may be mixed with the organic peroxide and the filler particles are then coated with this mixture of cross-linking agents. Alternatively, the auxiliary cross-linking agent, if used, may be incorporated directly in the resin containing the filler particles coated with the peroxide cross-linking agent.

By way of example, rubber vulcanization accelerators useful as secondary cross-linking agents include, in addition to sulfur, the mercaptobenzothiazoles, sulfocarbamides, for instance diphenyl thiourea, diethyl or dibutyl dithiocarbamic acid ester of zinc or selenium, benzothiazyl bisulfide, as well as dinitrobenzene and dioximes of benzoquinones. The nitrogen accelerators strongly discolor the compounds and if it is desired to prepare white polyethylene compositions, they should, therefore, not be used.

I have found that mixing the polyethylene resin with the particulate filler material having a cross-linking agent or agents affixed thereto not only simplifies manufacture of the modified resin and its shaping into articles but it also assures the progressive and homogeneous incorporation of the agents in the polyethylene. It furthermore avoids such inconveniences as super-oxidation of the polyethylene or the formation of bubbles in the interior of the mixture and difficulties in processability.

Any suitable particulate filler material may be chosen for this purpose, including organic fillers, such as carbon black or vegetal fibers, or mineral fillers, such as different types of earth alkali metal salts, particularly calcium, magnesium and barium carbonates and sulfates, silica, kaolins, talcs, etc. . . . The white mineral fillers have been found of particular interest since they produce a polyethylene mixture of clear color.

The chemical composition of the filler material is relatively unimportant in the process of the present invention but it is preferred for the mineral fillers to be finely comminuted, preferably to an average particle size between about 0.5 and three microns. Filler particles of less than 0.5 micron are difficult to incorporate in polyethylene and require too much time for dispersion. They also cause heat by friction, all of which may cause a premature reaction of the cross-linking agents.

The cross-linking agents are fixed on the filler particles by means of a vehicle adapted to form a pellicle around each filler particle. The pellicle-forming fixing agent is an organic acid, preferably a saturated higher fatty acid. The fixing agent may act simultaneously as a lubricant and a hydrophobic coating, both of which properties are of great importance in the manufacture since they increase the rapidity of dispersion and facilitate the complete deflocculation of the particles. In this manner, the organic peroxide is affixed to the filling particles by a vehicle which operates as a dispersing agent to assure homogeneous dispersal of the filler and cross-linking agent in the polyethylene mass.

The fixing or lubricating agent may first be intimately mixed with the peroxide, which may be done in the presence of a volatile solvent which is then removed by heating the mixture to a temperature below the temperature of decomposition of the peroxide. Alternatively, the peroxide may first be applied to the filler particles, for instance by impregnating the particles with a peroxide solution, whereupon the solvent is removed and the fixing agent is applied to the particles carrying the peroxide. Cyclohexane or di-isopropyl benzene may be used as solvents for the peroxide.

Fatty acids useful as fixing and lubricating agents include, by way of example, lauric, palmitic and stearic acid, the latter being preferred particularly with a calcium carbonate filler. In this case, the $CaCO_3$ particles are heat-treated with stearic acid until calcium stearate is formed on the surface of the particles.

Suitable fixing agents also include unsaturated fatty acids, including acetylene acids, such as linoleic acid, acrylic acids, such as cinnamic and oleic acid, and linolinic acid; abietic acid from rosin; alcohol acids, such as ricinoleic, lactic and tartaric acid; polybasic acids, including dibasic aliphatic acids, such as adipic and maleic acid; sulfonic acids, such as $\alpha$- or $\beta$-naphthalene sulfonic acid; phenol acids, including hydroxy benzoic acids, such as salicylic acid; monobasic aromatic acids, including acids having the carboxylic group attached to the benzene ring directly or by means of a side chain; and dibasic aromatic acids, such as phthalic acid.

The amount of fixing agent or vehicle for the cross-linking agent may vary between 0.1% and 10% by weight, based on the filler material, preferably 0.5–5%.

Preferably, an antioxidant is fixed to the filler particles together with the cross-linking agent. Any suitable antioxidant may be used for this purpose, as those suggested or used by polyethylene producers.

The mixtures may be prepared dry as well as in the presence of humidity.

The filler having the cross-linking agents fixed thereon may be incorporated in the polyethylene resin in proportions up to 400% by weight, based on the weight of the polyethylene, preferably up to about 100% or 50%.

Polyethylene resins containing sizable amounts of such fillers have certain advantages over pure polyethylene such as reduced shrinkage during molding or no shrinkage at all, better solvent resistance and improved dielectric characteristics and heat resistance.

While the proportions of the components may vary widely, the following ranges are indicated by way of example and in no way as a limitation of the scope of the invention:

(1) Organic peroxide: about 0.2 to 5 parts by weight may be used per 100 parts of filler.

(2) Secondary cross-linking agents: about 0.1 to 3 parts by weight may be used per 100 parts of filler.

Generally speaking, the proportions of cross-linking agents useful for producing the polyethylene resins of the present invention correspond to those used in the vulcanization of rubber and, accordingly, the skilled in the art will have no difficulty in compounding suitable mixtures. For resins containing small amounts of filler, i.e. less than 25 parts by weight of filler per 100 parts of polyethylene, the indicated proportions of treating agents may be doubled.

Preferably, the filler will be mixed with the organic acid and the cross-linking agent or agents at a temperature high enough to fluidize the acid, for instance at a temperature between 50° C. and 250° C.

Suitable treating temperatures for reacting the polyethylene with the cross-linking agents correspond to the normal working temperatures of polyethylene in a mixer, i.e. they are of the order of 100 to 120° C. for polyethylene prepared at high pressure and of the order of 150 to 180° C. for polyethylene prepared at low pressure.

Preferably, the polyethylene resin is well softened in a Banbury mixer or on hot rollers before the filler with the cross-linking agent affixed thereto is incorporated in the resin. Working of the resin after the admixture of the filler should not be unduly prolonged.

The mixing temperature is preferably between 100° C. and 135° C., which is increased to about 145°–150° C. after the filler has been fully incorporated into the resin. The final heat treatment or vulcanization is effected at a temperature between about 145° C. and 165° C. for about five to 30 minutes.

The mixture of the resin and the filler should be as thorough as possible to obtain substantially perfect homogeneity. Any suitable crushing and/or mixing apparatus may be used for this purpose, as well known in the art of mixing.

The invention will be illustrated in the following examples, all parts being by weight.

*Example 1*

1.6 parts of dicumenyl peroxide and one part of stearic acid were intimately mixed with cyclohexane and the solvent was evaporated from the intimate mixture. This peroxide-acid mixture was then intimately mixed with 97.4 parts of calcium carbonate powder having an average particle size of about one micron. The mixture was effected in a micronizer of the fluid energy mill type or a "Fluid-mixer Henschel" at a temperature below the decomposition temperature of the peroxide, i.e. at about 120° C.

Alternatively, the calcium carbonate particles were impregnated with a solution of dicumenyl peroxide in cyclohexane or diisopropyl benzene. After the solvent was evaporated, the particles were treated in the above manner with stearic acid to fix the peroxide on the particles and coat them with the acidic lubricant.

This filler material was incorporated in a high-density polyethylene resin prepared at low pressure in the following manner:

The polyethylene was softened completely in a mixer heated to a temperature of 105° C. to 130° C. After the resin was soft, the filler material was progressively added to the softened resin until the mixture consisted of 50 parts of filler per 100 parts of polyethylene. After the filler was incorporated in the resin, the mixture was withdrawn in sheets and granulated.

The thus obtained polyethylene compound may be extruded in various shapes, such as tubes or filaments, or it may be used for injection molding. Extrusion or molding may be effected at a relatively low temperature of the order of 120° C. to 150° C.

The shaped polyethylene article was subjected to vulcanization at a temperature of 155° C. for 10 minutes. This produced or completed the cross-linking of the polyethylene macromolecules and resulted in an extremely homogeneous composition with the filler, endowed with excellent mechanical properties.

Even when the filler amount was increased up to 100 parts of filler per 100 parts of polyethylene, i.e. to 50% of the mixture, the compound still had mechanical characteristics useful for many fields of application. For instance, the resistance to tearing of an article produced from such a mixture is twice that of a polyethylene containing the same amount of non-treated filler. The tearing resistances obtained with the treated filler were 37 to 38 kg. while those of polyethylene articles containing the same amount of non-treated filler were only 18 kg.

The compound obtained by the process was non-flexible and was not brittle.

*Example II*

| | |
|---|---:|
| Parts of a colloidal kaolin (all particles about one micron) | 97.5 |
| Parts of dicumyl peroxide | 1.5 |
| Parts of lauric acid | 1.0 |
| | 100.0 | were treated as in Example I.

This filler was then mixed with the polyethylene of Example I in the same manner as therein described, the temperature of the mixture was reduced to about 150° C. and the mixture was withdrawn in sheets. After granulation, the polyethylene compound was extruded or injection-molded at a temperature of about 150° C. The shaped articles may be vulcanized as set forth in Example I with corresponding results.

*Example III*

| | Parts |
|---|---|
| Dolomite ($CO_3CaCO_3Mg$) | 98 |
| Dicumyl peroxide | 0.8 |
| n-Cyclohexylbenzothiazylsulfonamide (Santocure) | 0.2 |
| Palmitic acid | 1 |

The magnesium calcium carbonate was treated with the mixture of dicumyl peroxide, Santocure and palmitic acid in a micronizer at a temperature of about 80° C. 100 parts of the treated filler having particles of about 1 micron were mixed with 100 parts of high pressure polyethylene in a Banbury mixer at a temperature of about 110° C.

The compound was granulated, extruded at a temperature of 125° C. and submitted to a heat treatment: 145° C. for 15 minutes.

The main advantage of affixing the organic peroxide cross-linking agent on the filler particles resides in the rapid and perfect dispersion of the cross-linking agent in the polyethylene resin, which is assured thereby. If the peroxide is added directly to the resin, the results are not as favorable and many manufacturing difficulties are encountered, including poor extrusion characteristics bad surface appearance.

The effective degree of cross-linking of polyethylene is established by testing its breaking temperature according to test ASTM D 746–54 T. Cross-linking of polyethylene results in an improvement in the breaking temperature.

The following tests illustrate the advantage of the present invention.

(1) Standard: pure polyethylene of the high pressure type.
(2) 100 parts by weight of polyethylene and 100 parts by weight of calcium carbonate particles treated with 1% stearic acid.
(3) Same as (2) but 1.6 parts by weight of dicumyl peroxide were added to the polyethylene in the mixer.
(4) 100 parts of polyethylene and 100 parts of calcium carbonate filler treated according to Example I.

The above standard and comparative test samples were prepared in an open cylinder mixer at a temperature between 125° C. and 130° C., the mixture being pressure molded into plates for 15 minutes at a temperature of 150° C.

The breaking temperatures of the plates prepared from the four samples compared as follows:

(1) Had a breaking temperature of —50° C., (2) —10° C., (3) —20° C., and (4) —34° C.

Comparing samples (3) and (4), it will be readily appreciated that the affixing of the cross-linking agent on the filler improves the properties of the resin mixture.

While the invention has been described in connection with certain preferred embodiments and illustrated in some examples, it will be clearly understood that many modifications and variations may occur to the skilled in the art, particularly after benefiting from the present teaching, without departing from the spirit and scope of the invention as defined in the appended claim.

What is claimed is:

A process of preparing a filler for polyethylene resin, comprising the step of intimately mixing particles of a filler material selected from the group consisting of alkali earth metal salts and silica minerals with about 0.2 to 10%, by weight, of at least one organic peroxide polyethylene cross-linking agent of the general formula R—O—O—R$^1$, wherein R and R$^1$ are α-aryl substituted alkyl groups, and about 0.1 to 10%, by weight, of a saturated higher fatty acid, both weights being based on the weight of the filler material, at a temperature above the melting temperature of the organic acid but below the decomposition temperature of the cross-linking agent, whereby the melted organic acid constitutes a vehicle for the cross-linking agent and fixes it to the filler particles.

References Cited in the file of this patent

UNITED STATES PATENTS

| 2,290,914 | Machlin | July 28, 1942 |
|---|---|---|
| 2,628,214 | Pinkney et al. | Feb. 10, 1953 |
| 2,655,492 | Young et al. | Oct. 13, 1953 |
| 2,668,749 | McHan | Feb. 9, 1954 |
| 2,826,570 | Ivett | Mar. 11, 1958 |
| 2,888,424 | Precopio | May 26, 1959 |

FOREIGN PATENTS

| 563,517 | Belgium | Jan. 15, 1958 |
|---|---|---|
| 556,265 | Belgium | Apr. 15, 1957 |

OTHER REFERENCES

Zimmerman et al.: "Handbook of Material Trade Names," 1953 Edition, p. 343 of interest.